Figure 1:
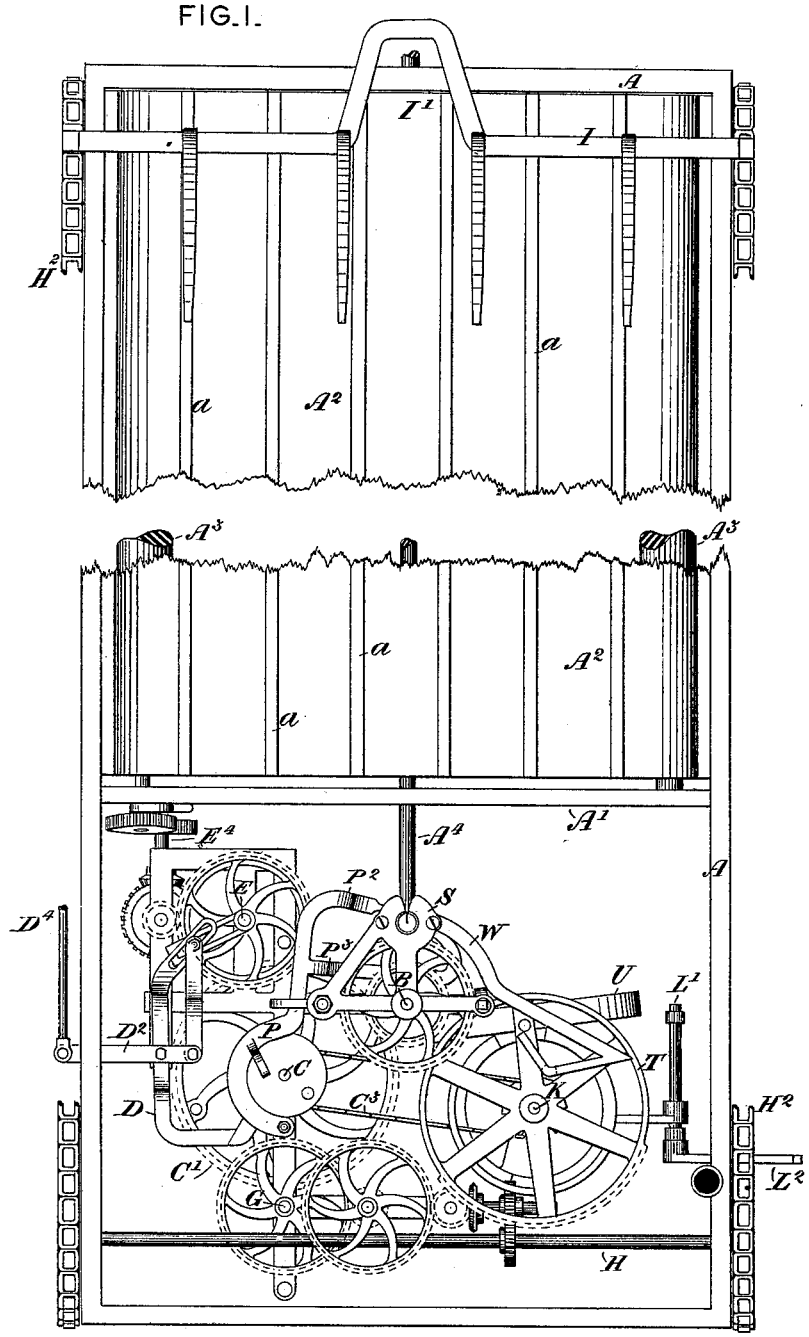

6 Sheets—Sheet 1.

E. R. WHITNEY.
Grain-Binder.

No. 206,846. Patented Aug. 6, 1878.

Witnesses:
W. A. Flynn
Arthur Telford

E. R. Whitney
Inventor:
Per Atty. Rashly Reynolds

6 Sheets—Sheet 2.

E. R. WHITNEY.
Grain-Binder.

No. 206,846.      Patented Aug. 6, 1878.

Witnesses:
W. A. Flynn
Robt. Arthur Kellond

E. R. Whitney,
Inventor:
Per Atty.

6 Sheets—Sheet 3.

E. R. WHITNEY.
Grain-Binder.

No. 206,846. Patented Aug. 6, 1878.

Witnesses:
W. A. Flynn
Arthur Kellond

E. R. Whitney
Inventor:
Per Atty.

6 Sheets—Sheet 4.

E. R. WHITNEY.
Grain-Binder.

No. 206,846. Patented Aug. 6, 1878.

Witnesses:

Inventor:
Per Atty.

6 Sheets—Sheet 5.
E. R. WHITNEY.
Grain-Binder.
No. 206,846. Patented Aug. 6, 1878.
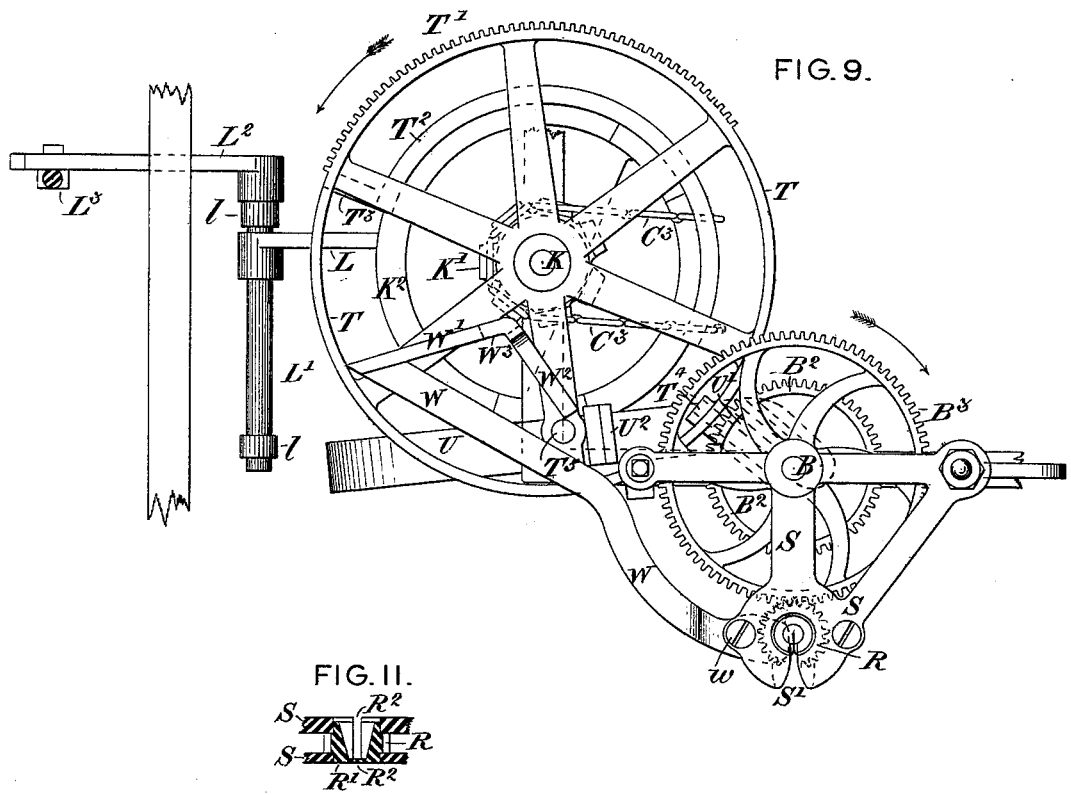
FIG. 9.
FIG. 11.
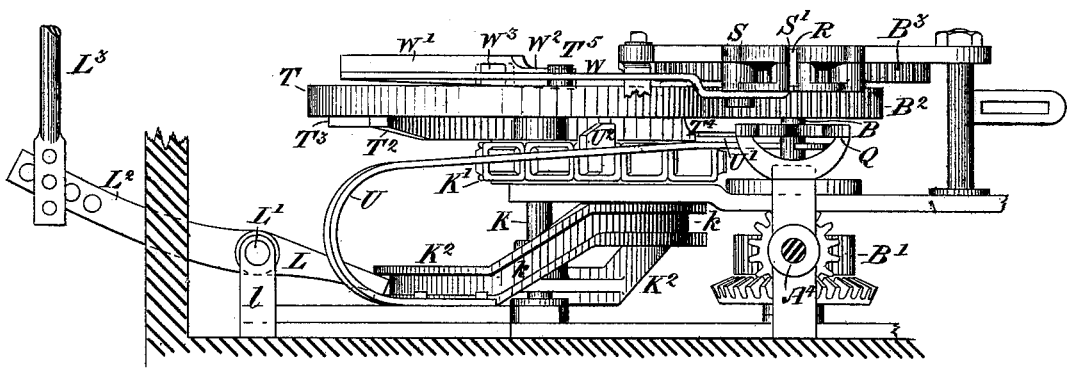
FIG. 10.
Witnesses:
E. R. Whitney,
Inventor:
Per Atty.

6 Sheets—Sheet 6.

E. R. WHITNEY.
Grain-Binder.

No. 206,846. Patented Aug. 6, 1878.

UNITED STATES PATENT OFFICE.

EDWIN R. WHITNEY, OF MAGOG, QUEBEC, ASSIGNOR OF ONE-HALF HIS RIGHT TO ANGUS McKAY AND CHARLES LUCIEN BOSSÉ, OF MONTREAL, CANADA.

IMPROVEMENT IN GRAIN-BINDERS.

Specification forming part of Letters Patent No. 206,846, dated August 6, 1878; application filed February 16, 1878.

*To all whom it may concern:*

Be it known that I, EDWIN RUTHVEN WHITNEY, of the village of Magog, in the county of Stanstead and Province of Quebec, Canada, have invented certain new and useful Improvements in Grain-Binders; and I do hereby declare that the following is a full, clear, and exact description of the same.

The object of my invention is to produce a binder in which the elevator required in all the machines now in use to raise the gavel to the binding apparatus is dispensed with, and the whole mechanism arranged at or about the level of the platform, another desideratum sought being that the whole machine, with the binder, shall not present a greater front than any of the well-known types of reaping-machines.

Its principal features may be thus described: In rear of the driving-wheels of the reaper, at the level of the platform and on its delivery side, is placed a frame (suitably supported at its rear end) carrying rollers slightly inclined upward toward the back, over which runs an endless belt or apron, moving in the line of delivery and actuated automatically, the distance moved being, at the will of the driver, varied according to the length of straw of the grain to be bound. Across this belt, and at right angles to the line of its movement, runs back and forth a carrier, bunching the grain deposited on the apron, bringing it up to the binding apparatus proper, and pressing it up against the binding wire or cord, which is held loosely between the needle-arm and suitable holders below.

The needle-arm, which is actuated by a rock-shaft, and is pivoted thereto in such a manner as not to describe in its movement a regular segment of a circle, is then set in motion, taking the wire round the sheaf and laying the end between the holders above mentioned placed below the twisters, these being so arranged that the wire or cord comes exactly in front of a slot in the twister proper, into which it is pushed by a device for that purpose, also operating to cut off the ragged twisted end of the wire. The pierced or bored pinion, which constitutes the twister, is then rotated till the wire is sufficiently wound, and is then locked in place, the band being then cut off from the wire-roll by a suitable knife or cutter.

The whole of these different mechanisms are so constructed and timed as to work in proper sequence in performing the several operations required to bind the gavel into a sheaf. The several movements are also positive and direct, no springs being used to return the different parts to their normal positions after having performed their functions.

For fuller comprehension, however, of my invention, reference must be had to the annexed drawings, in which—

Figure 2:
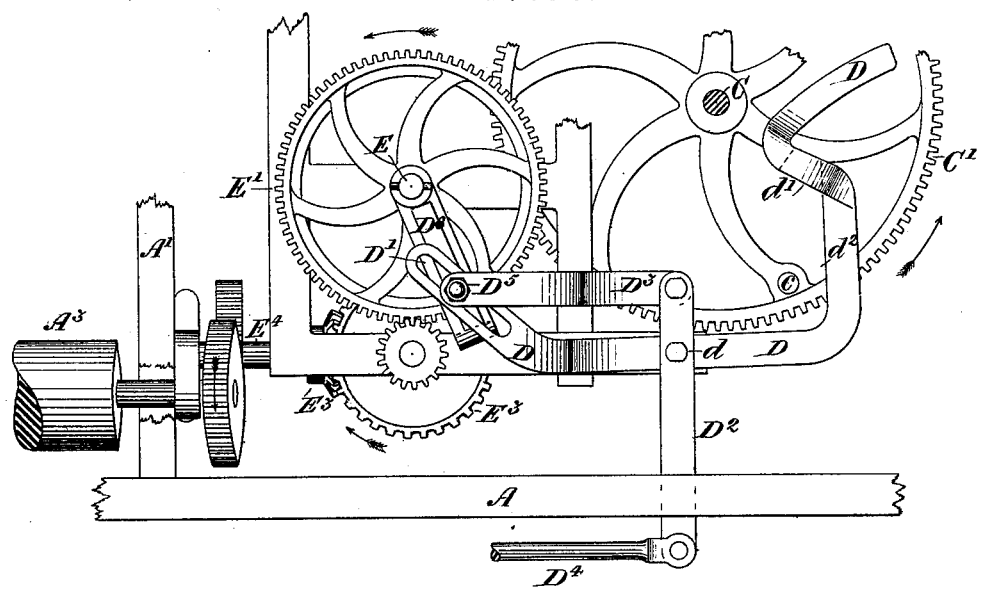
Figure 4:
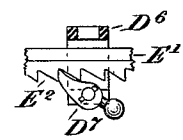
Figure 3:
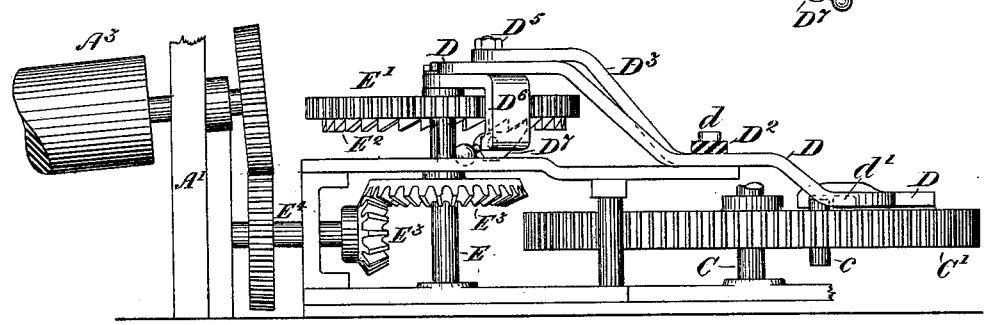
Figure 5:
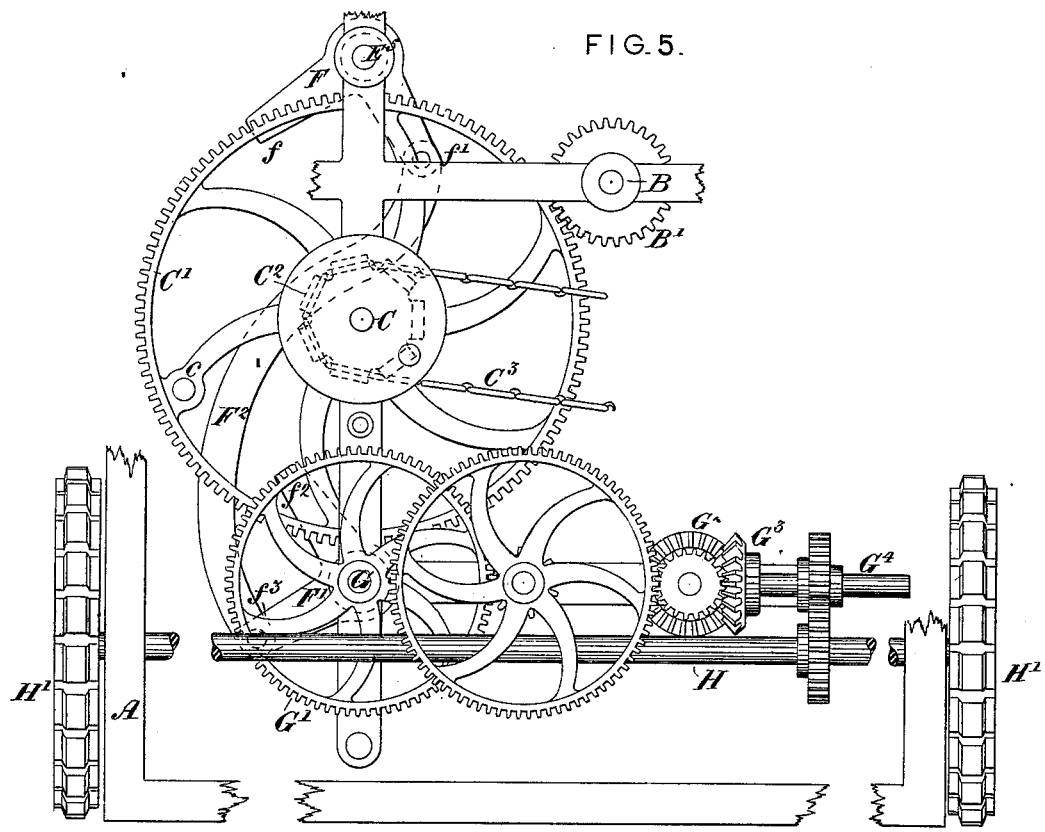
Figure 6:
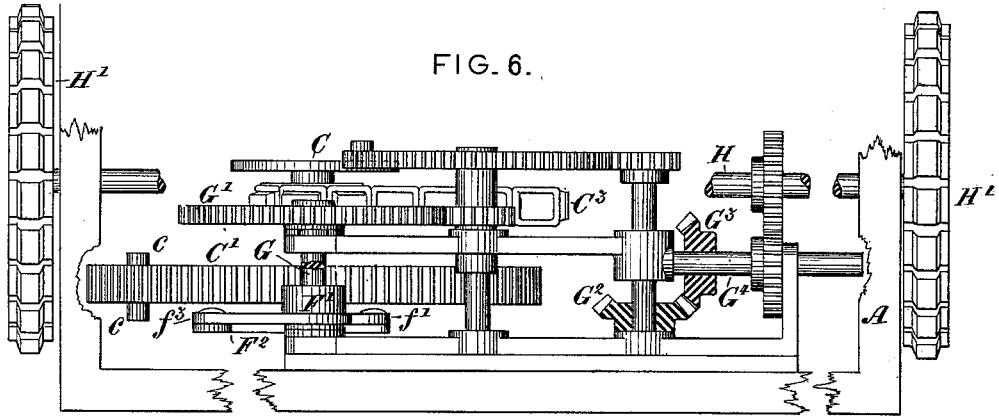
Figure 7:
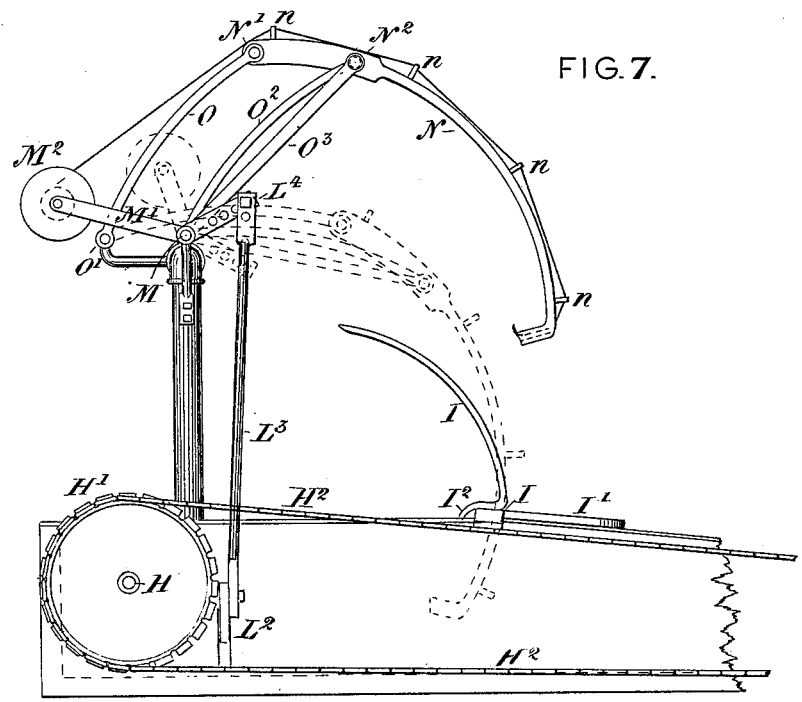
Figure 8:
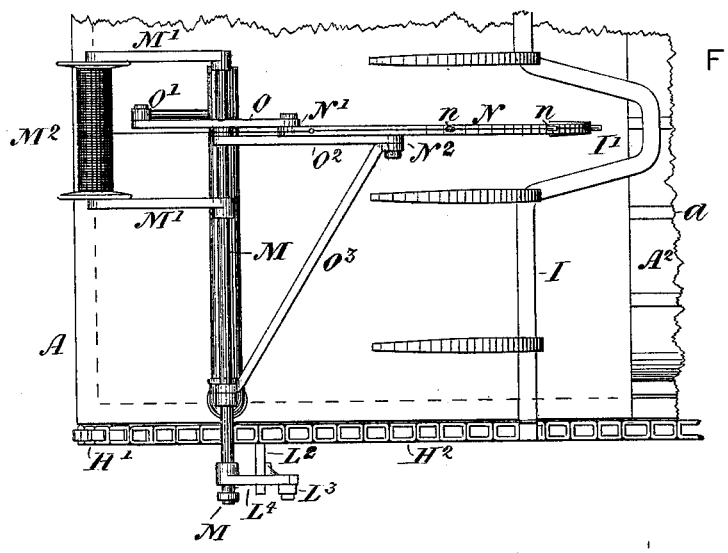
Figure 12:
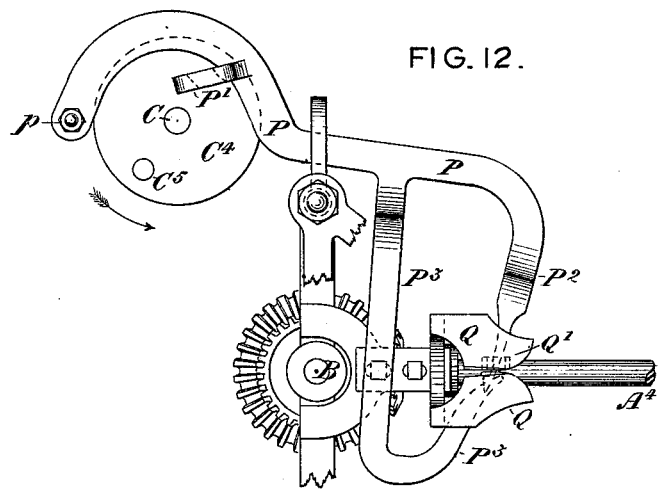
Figure 13:
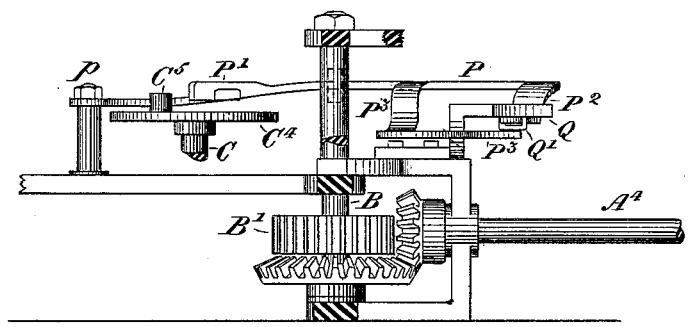

Figure 1 is a general plan of the binder with cover and needle-arm removed. Fig. 2 is a plan of mechanism for operating apron. Fig. 3 is a side elevation of same. Fig. 4 is a detail of pawl. Fig. 5 is a plan of mechanism operating grain-carrier. Fig. 6 is a rear view of same. Fig. 7 is a part side elevation of machine, showing needle-bar, &c. Fig. 8 is a part plan view of same. Fig. 9 is a plan of mechanism for operating needle-bar, twister, &c. Fig. 10 is a front elevation of same. Fig. 11 is a sectional elevation of twister. Fig. 12 is a plan of holders and forked lever. Fig. 13 is a side view of same.

Similar letters of reference indicate like parts.

A is the frame of the machine, secured to the reaper, as before mentioned, in rear of the driving-wheels by any suitable bolt or fastening, and may be also attached to the platform so as to fit closely against its delivery side. The rear end of this frame is carried by any suitable wheels, and contains the binding apparatus proper, which is separated by a cross-piece, $A^1$, from the space occupied by an endless belt or apron, $A^2$, revolving, at right angles to the line of traction, on rollers $A^3$ inclined upward toward their rear ends, to one of which motion is given, as will be presently described. Upon this apron, the width of which will equal that of the delivery side of the platform, are secured any desired number of slats or projections, $a$.

$A^4$ is a shaft running through the apron $A^2$, connected at its forward end with the reaper, to which the apparatus is attached and rotated from any going part of its machinery. This shaft, by means of bevel-gears or their equivalent, rotates the vertical main shaft B, carried in any suitable frame or bearings, from which the whole binding apparatus receives motion. Upon this shaft is keyed a pinion, $B^1$, intermeshing with a wheel, $C^1$, also keyed onto a vertical shaft, C. In this gear is fixed, as shown, a pin, $c$, projecting both above and below it, the upper end of which acts upon a bent lever, D, of the form shown in Figs. 1, 2, and 3, pivoted at $d$, having in its forward end a slot, $D^1$, and with groove formed, where shown at $d'$, in its under side, to allow of the passage through it of the pin $c$. On this point $d$ is pivoted a lever, $D^2$, connected at its outer end to a rod, $D^4$, led to the driver's seat, under his control, and secured in any desired position by a suitable locking device. To the inner end of this lever $D^2$ is pivoted a link, $D^3$, adjustably connected by means of a pin, $D^5$, with the slotted end $D^1$ of the lever D, and a slotted arm, $D^6$, pivoted to the spindle E and clipping the periphery of the gear-wheel $E^1$, on the under side of which is formed a ratchet, $E^2$, in which intermeshes a weighted pawl, $D^7$, (shown in detail in Fig. 4,) pivoted to the under side of the arm $D^6$. Upon this spindle E is mounted a bevel-gear, $E^3$, intermeshing with another gear, $E^3$, mounted on a counter-shaft, $E^4$, which, by suitable gears, imparts a rotary motion to the outer roller, $A^3$, of the apron $A^2$.

I will now proceed to describe the mechanism by which the grain is brought up to the binder, as shown more particularly in Figs. 1, 5, 6, 7, and 8. Upon a spindle, $E^5$, placed where shown, is mounted loosely a crank, F, composed of two arms, $f f^1$; and upon the spindle G of the gear-wheel $G^1$ is firmly fixed another bell-crank, $F^1$, similarly formed of arms $f^2 f^3$, the ends of the arms $f^1 f^3$ being connected by a bar, $F^2$, curved, if required, as in this case. The wheel $G^1$ is arranged to communicate, through a series of gears arranged in the ordinary way, motion at any increased rate of speed to a bevel-pinion, $G^2$, intermeshing with another pinion, $G^3$, mounted on a shaft, $G^4$, rotating through suitable gears the shaft H, passing through the frame A, and having mounted upon its ends pitch-chain wheels $H^1$, over which run chain-belts $H^2$, passing over similar wheels at the forward end of the frame A. Upon these belts $H^2$ is secured the grain-carrier I, of the form shown in Figs. 1, 7, and 8, having formed in its lower bar, from which the teeth spring, a set, as at $I^1$, toes $I^2$ projecting downward from each prong close to the level of the slats $a$.

If desired, guides of any kind may be formed on the sides of the frame A to prevent lateral movement of the carrier; and it may, in some cases, be made to set loosely upon standards secured on the belts $H^2$, so as to enable it to rise.

The mechanism for operating the arm carrying the wire or needle-bar is shown in Figs. 7, 8, 9, and 10, and may be thus described: Upon the spindle C and above the gear-wheel $C^1$ is keyed a pitch-chain wheel, $C^2$, driving, by means of a chain-belt, $C^3$, a similar wheel, $K^1$, mounted rigidly upon a shaft, K, upon which is secured a cam-wheel, $K^2$, of the form shown particularly in Fig. 10, having on its periphery a groove, $k$, in which works an arm, L, keyed onto and partially rotating a rock-shaft, $L^1$, (carried in suitable bearings $l$,) on this being mounted a lever, $L^2$, connected adjustably (both vertically and horizontally) by a link, $L^3$, to a lever, $L^4$, keyed onto a rock-shaft, M, carried in proper bearings raised above the apparatus and imparting motion thereto. To this rock-shaft are secured rigidly arms $M^1$, in which are formed bearings for the spindle of the reel $M^2$ carrying the wire, and from which it is taken, through suitable eyes $n$, along the curved arm or needle-bar N to its point, made in the usual way in which similar arms are formed on other binders. The rear end $N^1$ of this needle-bar is attached by a pivot to a curved brace or link, O, pivoted at its other end to curved arm, $O^1$, carried out from the frame of the machine. The binding-arm or needle-bar N is also pivoted, where shown at $N^2$, to a curved arm, $O^2$, keyed onto the rock-shaft M, and moving with it, and is further provided with a stay or brace, $O^3$, pivoted at both ends, as shown in the drawings, to stiffen it.

The apparatus for holding and twisting the wire passed round the sheaf is shown in Figs. 9, 10, 11, 12, and 13, and is as follows: Upon the shaft C, rotated as before described, is mounted a disk, $C^4$, carrying a pin, $C^5$, which, as the disk revolves, strikes against and passes through a grooved lug, $P^1$, secured to a lever, P, pivoted at $p$ to any suitable stud or part of the frame, this lever ending in two arms, $P^2 P^3$, of the configuration shown in Fig. 12, the former having at its end a cutting-edge, and both being bent so as to pass freely under the holders Q, (shown in Figs. 10, 12, and 13,) the fork $P^2$ moving in a guide, $Q'$, formed on the under side of these. The opening between these holders will be exactly in a vertical line with that of the twister proper above, when this is locked in place.

This twister is shown in Figs 1, 9, 10, and 11, and is formed by boring out or casting in that shape a small pinion, R, and placing in or securing to the bottom a plate, $R^1$, the whole being carried in a frame, S, which is, as at $S'$, formed so as to give access to the slot $R^2$ cut in the side and bottom of the twister, and into which the wire or cord is set.

If desired, the bottom plate $R^1$ may be made in one with the twister proper R.

The twister receives its motion as will now be described: Upon the shaft K (rotated, as before described, by pitch chains and wheels from the shaft C) is keyed a wheel, T, having a portion, $T^1$, of its periphery toothed so as to intermesh intermittently with a gear-wheel, $B^2$, mounted loosely on the main shaft B, but keyed to and revolving another gear, $B^3$, which intermeshes with and rotates the twister.

U is a bow-spring, secured in any suitable position and having formed on its upper side a lug, $U^1$, which fits into a corresponding opening or groove in the wheel $B^2$, and upon the under side of the wheel T is formed a cam, $T^2$, having one end splayed off, so as to slide onto a projection, $U^2$, on the upper side of the spring and hold it down, thus releasing the wheel $B^2$ and allowing it to rotate, motion being imparted to it, in the first instance, by means of a lug, $T^3$, formed on the under side of the wheel T, and striking against a projection, $T^4$, cast on the under side of $B^2$.

W is a lever, pivoted at $w$ to the frame S, and having on its inner end a cutting-edge to sever the wire when twisted, this lever being of the form shown in Fig. 9, with a bend, $W^1$, and return-bend $W^2$, the former one being grooved, as at $W^3$, to allow of the passage through it of the pin $T^5$, by which it is operated.

By increasing the time of rotation of the twister and slightly altering the construction of the holders, so as to give a longer twisted end, my apparatus will serve equally well where cord is used instead of wire for the binding material.

The whole of the operating part of the machine is provided with a cover, to prevent the machinery from becoming clogged with straw, dirt, &c.

The manner in which the several devices which form the whole binding apparatus work is as follows, the description following the sequence of their operation.

The gear-wheel $B^1$ on the main shaft B rotates the gear-wheel $C^1$, carrying the pin $c$, which, striking the lever D, throws over in the opposite direction its forward end, and communicates a corresponding motion to the arm $D^6$ through its connection therewith by the pin $D^5$ passing through it and the slot $D^1$. To this arm $D^6$ is pivoted the weighted pawl $D^7$, which, striking into the ratchet $E^2$, turns the wheel $E^1$ a distance corresponding to the throw of the lever, thus rotating the roller $A^3$, and with it the apron $A^2$, the intermediate gearing being so timed that the full throw of the lever D shall rotate the roller $A^3$ sufficiently to cause the apron $A^2$ to move about the distance between the rollers.

The driver can, however, by means of the rod $D^4$, so act upon the link $D^3$, through the lever $D^2$, as to move the pivot-point $D^5$, at the junction of the lever D and arm $D^6$, farther from or nearer to the pivot E of this arm $D^6$, and thus, as this point will move, when acted upon, in a larger or smaller circle, regulate the length of throw of the lever D, and consequently the distance moved by the apron, so as to accommodate the apparatus to grain with short straw.

All these motions are accomplished while the pin $c$ is pressing against the transverse portion of the lever D; but as soon as this is done, the movement of the levers D and $D^2$ and arm $D^6$ is reversed, (the pawl passing backward over the ratchet $E^2$,) and the parts restored to their former positions by the pin $c$, which, passing through the groove $d^1$ and coming in contact with the curved end of the lever D, throws it over.

The grain having been, by the action just described, carried from the platform of the reaper and laid evenly upon the surface of the apron $A^2$, the devices which carry the gavel to the binding apparatus proper, and which are timed to act at this juncture, come into operation as follows:

The pin $c$ on the pinion $C^1$, immediately after operating upon the rear end of the lever D to restore it and the parts connected therewith to their prior positions, comes in contact with the arm $f^2$ of the crank $F^1$, which, through the bar $F^2$ pushing forward the lower arm, $f^1$, of the lever F, brings the other arm, $f$, within the course of the pin $c$, at the same time rotating the shaft G, and with it the gear $G^1$, for any given proportion of its revolution. This gear-wheel $G^1$ turns, through the other gears, the bevels $G^2$ $G^3$ at a higher rate of speed. These, imparting motion to the shaft $G^4$, rotate the shaft H at such speed that the initial motion given to the gear $G^1$ will, through the intermediate mechanism, cause the pitch-chain wheels $H^1$ to revolve sufficiently to cause the grain-carrier I to advance the whole length of the apron, gathering up the grain and forcing it into the bight of the wire held between the needle-arm and the holders. The operation, presently to be described, of passing the wire round the sheaf and fastening it, is then performed, the sheaf being meanwhile held in place by the carrier I.

By this time the revolution of the pinion $C^1$ has brought the pin $c$ round to where the arm $f$ of the crank F lies in its course, and this, being struck by the pin, turns back the arm $f^1$, and with it the bar $F^2$ and crank $F^1$, to their first positions, thus entirely reversing the previous action, and rotating the pinion $G^1$, and with it the pitch-chain wheels $H^1$, so as to run the carrier I back to the forward end of the apron $A^2$, leaving it clear for a fresh supply of grain; and in this juncture it may be mentioned that only every alternate or third rake may be arranged to sweep the platform, so as to allow time for the binding to be performed.

The gavel having been, as just mentioned, pressed by the carrier I up against the wire held loosely between the end of the needle-bar or wire arm N and the holders Q, (being retained between the latter by the twisted end remaining from the sheaf previously bound,) enough wire runs off the reel $M^2$ to give bight sufficient to encircle the sheaf. At this moment the revolution of the cam-wheel $K^2$ will cause the arm L to rise in the groove $k$, thus, through the rock-shaft L, lever $L^2$, and link $L^3$, pulling down the outer end of the lever $L^4$, and partially turning the rock-shaft M in that direction, by this means lowering the needle-arm N to the position shown in dotted lines in Fig. 7, the curve described by it in its course being governed by the double arrangement of its pivoting, (i. e., to the curved arm $O^2$, keyed on the rock-shaft M, and by the curved brace O to the projecting arm $O^1$,) and is such as to keep the point close into the gavel, and prevent an overplus of wire being drawn off the reel; and, further, to obviate any chance of the wire being taken around the carrier as well as the sheaf, the set $I^2$ in the lower bar of the grain-carrier also assisting in this.

The position of the point of the needle at the end of the stroke of the arm N is such as to bring the wire which has passed round the sheaf into the opening between the holders Q, where it is at once acted upon by the arm $P^3$ of the lever P, actuated by the pin $C^5$ pressing against the lug $P^1$, which pushes it in still farther, causing it to enter the slot $R^2$ in the twister R, and the pin $C^5$ then passing through the inclined groove in the lug $P^1$ gives it a positive reverse motion, actuating the arm $P^2$, which, by its cutting-edge, removes from below the holder the twisted end of wire. The mechanism for revolving the twister is turned to operate at this juncture, the revolution of the gear-wheel T causing the cam $T^2$ to press down the bow-spring U, thus leaving the gear-wheel $B^2$, and with it the pinion $B^3$, intermeshing with and rotating the twister, free to revolve, motion being imparted thereto first by the lug $T^3$ striking against the projection $T^4$ on the under side of $B^2$ and starting it, thus avoiding any chance of breaking the gear-teeth, the rotary motion being continued by the segment $T^1$, which is of such length as to turn the twister R a sufficient number of times to give a perfect fastening to the wire or cord.

The motion is stopped at the moment when the slot $R^2$ of the twister is exactly behind the opening $S^1$ in the frame and above the space between the holders Q, the wire bound round the sheaf being then, by the cutting-edge of the lever W, severed from the part held between the holders and close below the twister, leaving a short piece of the twisted end above the holders, so as to prevent the wire from being drawn through them when the needle-bar rises. This lever W is operated by the pin $T^5$ pressing on the bend $W^1$, the lever being returned to its normal position by the action of this pin $T^5$ passing through the groove $W^3$, and acting on the inner side of the return piece $W^2$. The sheaf being thus completely bound, the needle-arm N, operated by the reverse movement of the parts actuating it, rises, leaving, as before, the length of wire between its point and the holders. The several operations just described are now repeated in the foregoing order, each sheaf being pushed toward the rear of the machine and out over ways, which may be provided for it at the back, by the one following it.

What I claim is as follows:

1. In a low level grain-binder, the combination, with the binding apparatus proper, of an endless belt or apron, operated automatically by positive lever motion, to be moved intermittingly in a direction parallel or coinciding with the length of the gavel as it lies upon the belt, and taking the grain from the delivery-platform, substantially as set forth.

2. In combination with a lever acted upon positively and automatically to give, through a pivoted pawl-and-ratchet-gear wheel, motion to the gears and rollers working the apron $A^2$, a lever controlled by the driver and operating to vary the throw of the actuating-lever, and thus diminish or increase the distance traveled by the apron, all substantially as herein set forth.

3. In an automatic grain-binder, the combination, with the traveling belt or apron, of a grain-carrier traversing it at right angles back and forth, and operated in either direction by a positive lever motion, substantially as and for the purposes set forth.

4. The grain-carrier I, with set $I^1$ formed on its lower bar, and toes $I^2$ projecting from the prongs, as and for the purposes set forth.

5. The combination of the cam-wheel $K^2$, constructed as shown, lever $L^2$, operated by the same, link $L^3$, arm $L^4$, and rock-shaft M, substantially as and for the purposes herein set forth.

6. In a low level automatic grain-binder, the forked lever P, operated positively in either direction by the lug $C^5$, mounted on the revolving disk $C^4$, and working against and through the grooved lug $P'$ on the lever, in combination with the twister and the jaws or holders below it, substantially as and for the purposes set forth.

7. The combination of the twister, the pinion $B^3$, the gear-wheel $B^2$, having radial projection $T^4$ on its under side, the wheel T, with lug $T^3$, and the toothed segment $T^1$, all substantially as and for the purposes herein set forth.

8. The combination, with the grooved gear-wheel $B^2$, through which motion is imparted to the twister of spring U, holding the latter stationary, provided with lug $U^1$, fitting into wheel $B^2$, and lug $U^2$, acted upon by cam $T^2$, mounted on and revolving with shaft K, all constructed substantially in the manner set forth, and for the purposes described.

9. The combination of the wheel T, having toothed portion $T^1$, cam $T^2$, and lug $T^3$, the loose gear-wheel $B^2$, grooved, as described, and provided with projection $T^4$, the gear-wheel $B^3$, twister R, and bow-spring U, having lugs or projections $U^1$ $U^2$, all constructed substantially as and for the purposes herein set forth.

E. R. WHITNEY.

Witnesses:
ANGUS McKAY,
FRAS. HY. REYNOLDS.